(12) United States Patent
Baik et al.

(10) Patent No.: US 8,760,505 B2
(45) Date of Patent: Jun. 24, 2014

(54) IMAGE DISPLAY DEVICE FOR DISPLAYING TWO-DIMENSIONAL PLANE IMAGE AND THREE-DIMENSIONAL STEREOSCOPIC IMAGE

(75) Inventors: Insu Baik, Gyeonggi-do (KR); Hoon Kang, Gyeongg-do (KR)

(73) Assignee: LG Display Co., Ltd., Seoul (KR)

( * ) Notice: Subject to any disclaimer, the term of this patent is extended or adjusted under 35 U.S.C. 154(b) by 385 days.

(21) Appl. No.: 12/952,436

(22) Filed: Nov. 23, 2010

(65) Prior Publication Data

US 2011/0122239 A1    May 26, 2011

(30) Foreign Application Priority Data

Nov. 24, 2009 (KR) .................. 10-2009-0113973

(51) Int. Cl.
*H04N 13/04* (2006.01)
*H04N 9/31* (2006.01)

(52) U.S. Cl.
CPC .......... *H04N 13/0434* (2013.01); *H04N 9/3167* (2013.01); *H04N 13/0409* (2013.01)
USPC ................ 348/58; 345/32; 359/465; 351/240

(58) Field of Classification Search
CPC ....................................................... H04N 13/04
USPC ..................................................... 348/51, 58
IPC ....................................................... H04N 13/04
See application file for complete search history.

(56) References Cited

U.S. PATENT DOCUMENTS

| 2007/0008406 A1* | 1/2007 | Shestak et al. ................. 348/58 |
| 2010/0149321 A1* | 6/2010 | Ushiki et al. .................... 348/51 |

\* cited by examiner

*Primary Examiner* — Jay Patel
*Assistant Examiner* — Neil Mikeska
(74) *Attorney, Agent, or Firm* — Morgan, Lewis & Bockius LLP

(57) ABSTRACT

An image display device including an image display panel configured to display a 2D image and a 3D image, a driving circuit configured to apply a data voltage of a 2D data format or a data voltage of a 3D data format to the image display panel, a controller configured to control the driving circuit in a 2D mode for displaying the 2D image or a 3D mode for displaying the 3D image, and a patterned retarder including a first retarder and a second retarder that are arranged line by line, the patterned retarder configured to divide the 3D image from the image display panel into a first polarization component and a second polarization component, the patterned retarder being aligned so that boundary portions of the first and second retarders are positioned in a center of pixels positioned on odd-numbered horizontal lines or even-numbered horizontal lines of the image display panel.

19 Claims, 10 Drawing Sheets

(a)

(b)

IMAGE DISPLAY DEVICE FOR DISPLAYING TWO-DIMENSIONAL PLANE IMAGE AND THREE-DIMENSIONAL STEREOSCOPIC IMAGE

This application claims the benefit of Korea Patent Application No. 10-2009-0113973 filed on Nov. 24, 2009, which is hereby incorporated by reference.

BACKGROUND OF THE INVENTION

1. Field of the Invention

The present invention relates to an image display device, and more particularly to an image display device for displaying a two-dimensional plane image (hereinafter referred to as '2D image') and a three-dimensional stereoscopic image (hereinafter referred to as '3D image').

2. Discussion of the Related Art

An image display device displays a 3D image using a stereoscopic technique or an autostereoscopic technique.

The stereoscopic technique, which uses a parallax image between left and right eyes of a user with a high stereoscopic effect, includes a glasses type method and a non-glasses type method. In the glasses type method, the parallax image between the left and right eyes is displayed on a direct-view display or a projector through a change in a polarization direction of the left and right parallax image or in a time-division manner. Thus, a stereoscopic image is displayed using polarization glasses or liquid crystal shutter glasses. In the non-glasses type method, an optical plate such as a parallax barrier for separating an optical axis of the parallax image between the left and right eyes is generally installed in front of or behind a display screen.

As shown in FIG. 1, the image display device using the glasses type method may include a patterned retarder 5 for converting polarization characteristics of light incident on polarization glasses 6 on a display panel 3. In the glasses type method, a left eye image (L) and a right eye image (R) are alternately displayed on the display panel 3, and the polarization characteristics of light incident on the polarization glasses 6 are converted by the patterned retarder 5. Accordingly, the glasses type method implements a 3D image by spatially dividing the left eye image (L) and the right eye image (R). In FIG. 1, a reference numeral 1 denotes a backlight unit providing light to the display panel 3, and reference numerals 2 and 4 denote polarizing plates respectively attached on upper and lower surfaces of the display panel 3 so as to select a linear polarization.

In the glasses type method, visibility of the 3D image is degraded due to crosstalk generated at the position of an upward or downward viewing angle. As a result, in the general glasses type method, the upward/downward viewing angle allowing the user to view the 3D image of good image quality is very narrow. Crosstalk is generated because the left eye image (L) passes through a right eye patterned retarder region as well as a left eye patterned retarder region and the right eye image (R) passes through the left eye patterned retarder region as well as the right eye patterned retarder region at the position of the upward/downward viewing angle. Thus, as shown in FIG. 2, Japanese Laid Open Publication No. 2002-185983 describes a method for obtaining a wider upward/downward viewing angle by forming black stripes (BS) in patterned retarder regions corresponding to black matrixes (BM) of a display panel to thereby improve the visibility of the 3D image. In FIG. 2, when observing at a predetermined distance (D), a viewing angle (α), at which the crosstalk is not theoretically generated, depends on the size of black matrixes (BM) of the display panel, the size of black stripes (BS) of the patterned retarder, and a spacer (S) between the display panel and the patterned retarder. The viewing angle (α) widens as the size of the black matrixes and the size of the black stripes increase, and as the width spacer (S) between the display panel and the patterned retarder decreases.

However, the related art image display device has the following problems.

First, the black stripes of the patterned retarder used to improve the visibility of the 3D image interact with the black matrixes of the display panel, thereby generating moiré. When a 2D image is displayed, the visibility of the 2D image is much degraded. FIG. 3 shows the results obtained by observing a 47-inch display device sample at a location 4 meters away from the display device to which the black stripes are applied. When the 2D image is displayed, moirés of 90 mm, 150 mm, and 355 mm are visible based on observation positions A, B, and C, respectively.

Second, the black stripes used to improve the visibility of the 3D image bring about a side effect allowing a luminance of the 2D image to be drastically degraded. This is because, as shown in FIG. 4(b), in the related art, predetermined portions of pixels of the display panel are covered by the black stripe patterns. Accordingly, when the 2D image is displayed, an amount of transmitted light is reduced by about 30% as compared with the case where the black strips are not formed as shown in FIG. 4(a).

SUMMARY OF THE INVENTION

Accordingly, the present invention is directed to an image display device that substantially obviates one or more problems due to limitations and disadvantages of the related art.

An object of the present invention is to provide an image display device capable of improving visibility of a 3D image without reducing visibility and a luminance of a 2D image.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the image display device includes an image display device including an image display panel configured to display a 2D image and a 3D image, a driving circuit configured to apply a data voltage of a 2D data format or a data voltage of a 3D data format to the image display panel, a controller configured to control the driving circuit in a 2D mode for displaying the 2D image or a 3D mode for displaying the 3D image, and a patterned retarder including a first retarder and a second retarder that are arranged line by line, the patterned retarder configured to divide the 3D image from the image display panel into a first polarization component and a second polarization component, the patterned retarder being aligned so that boundary portions of the first and second retarders are positioned in a center of pixels positioned on odd-numbered horizontal lines or even-numbered horizontal lines of the image display panel.

In another aspect, the image display device includes an image display device including an image display panel to display a 2D image and a 3D image, a driving circuit to apply a data voltage of a 2D data format or a data voltage of a 3D data format to the image display panel, a controller to operate the driving circuit in a 2D mode such that a 2D image is displayed or a 3D mode such that a 3D image is displayed, and a patterned retarder including alternating first and second retarders, the patterned retarder dividing the 3D image from the image display panel into a first polarization component and a second polarization component, the patterned retarder being aligned so that boundary portions of the first and second retarders are positioned in a center of pixels positioned on odd-numbered horizontal lines or even-numbered horizontal lines of the image display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the embodiments of the present invention, examples of which are illustrated in the accompanying drawings.

Figure 1:
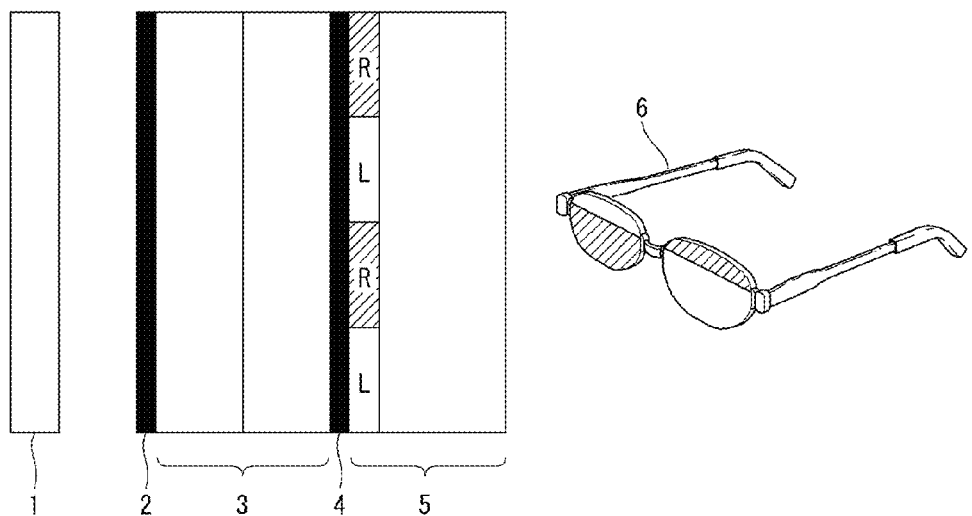
FIG. 1 illustrates a glasses type image display device according to the related art.
Figure 2:
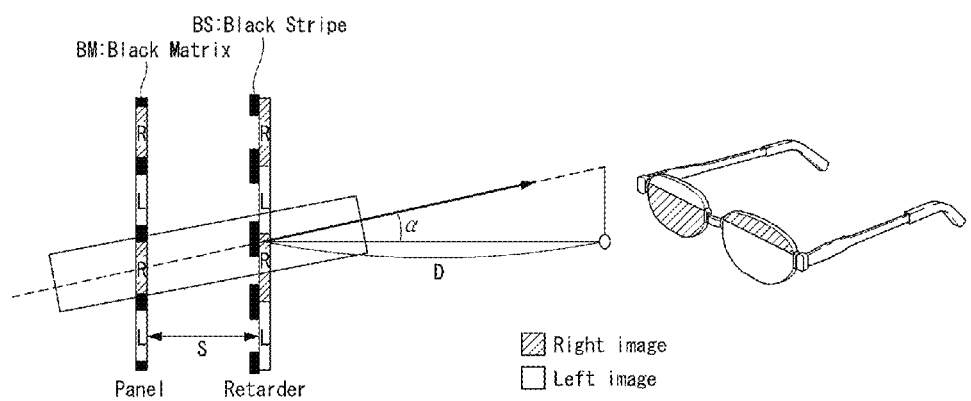
FIG. 2 illustrates formation of black stripes in a patterned retarder region corresponding to black matrixes of a display panel according to a related art image display device.
Figure 3:
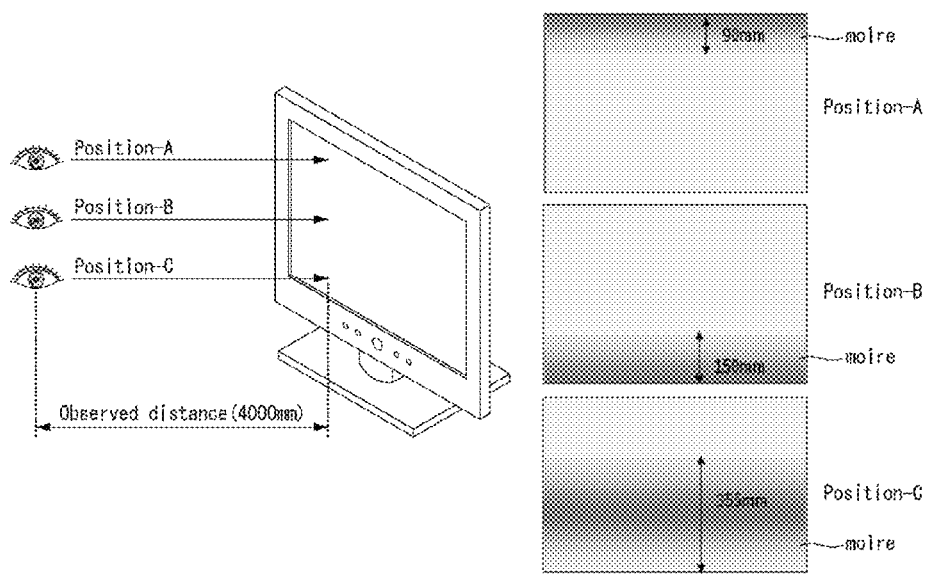
FIG. 3 illustrates moiré generated by black stripe patterns in an image display device according to the related art.
Figure 4:
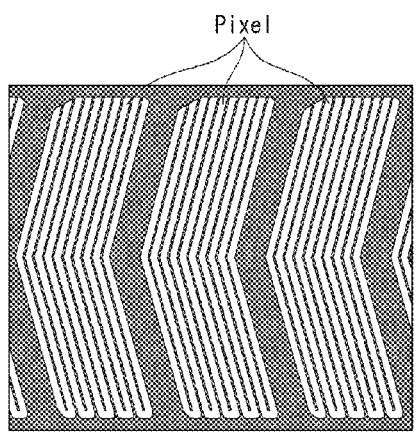
FIG. 4 illustrates a reduction in an amount of transmitted light due to a black strip pattern in an image display device according to the related art.
Figure 4:
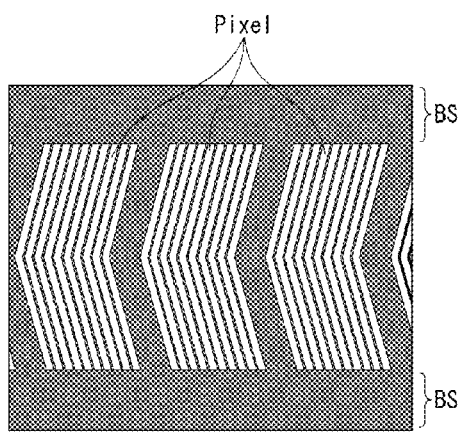
Figure 5:
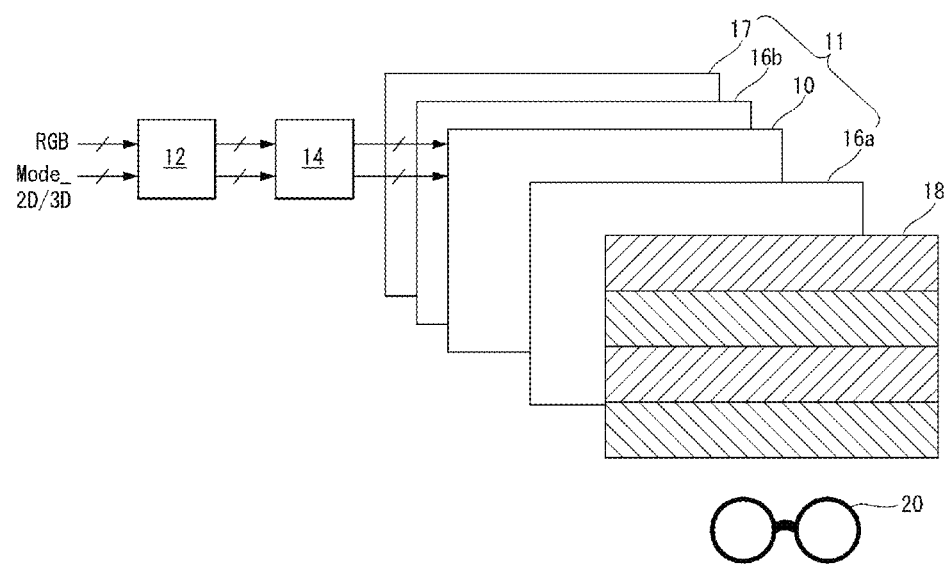
FIG. 5 illustrates an image display device according to an exemplary embodiment of the present invention.

FIG. 5 illustrates an image display device according to an exemplary embodiment of the invention. As shown in FIG. 5, an image display device according to an exemplary embodiment of the invention may include a display element 11, a controller 12, a driving circuit 14, a patterned retarder 18, and polarization glasses 20.

The display element 11 may be implemented as a flat panel display such as a liquid crystal display (LCD), a field emission display (FED), a plasma display panel (PDP), and an electroluminescence (EL) display including an inorganic EL display and an organic light emitting diode (OLED) display. When the display element 11 is implemented as an LCD, the image display device may further include a backlight unit 17 positioned under an image display panel 10, an upper polarizing film 16a positioned between the image display panel 10 and the patterned retarder 18, and a lower polarizing film 16b positioned between the image display panel 10 and the backlight unit 17. In the following description, the display element 11 is implemented as an LCD as an example for the sake of convenience. The patterned retarder 18 and the polarization glasses 20 serve as a 3D driving element and implement a binocular disparity by spatially separating a left eye image and a right eye image.

The image display panel 10 may include an upper glass substrate, a lower glass substrate, and a liquid crystal layer interposed between the upper and lower glass substrates. A thin film transistor (TFT) array may be formed on the lower glass substrate. The TFT array may include a plurality of data lines to which R (red), G (green), and B (blue) data voltages are supplied, a plurality of gate lines (or scan lines) that cross the data lines and receive a gate pulse (or scan pulse), a plurality of TFTs formed at crossings of the data lines and the gate lines, a plurality of pixel electrodes for charging liquid crystal cells to the data voltages, a storage capacitor that is connected to each pixel electrode and holds the voltage of the liquid crystal cells, and the like. A color filter array is formed on the upper glass substrate. The color filter array includes black matrixes, color filters, and the like. A common electrode, that is positioned opposite the pixel electrode and forms an electric field along with the pixel electrode, is formed on the upper glass substrate in a vertical electric field driving method such as a twisted nematic (TN) mode and a vertical alignment (VA) mode. The common electrode may be formed on the lower glass substrate along with the pixel electrode in a horizontal electric field driving method such as an in-plane switching (IPS) mode or a fringe field switching (FFS) mode. The upper polarizing film 16a may be attached to the upper glass substrate, and the lower polarizing film 16b may be attached to the lower glass substrate. Alignment layers for setting a pre-tilt angle of liquid crystals are respectively formed on the inner surfaces contacting the liquid crystals in the upper and lower glass substrates. A column spacer may be formed between the upper and lower glass substrates to keep cell gaps of the liquid crystal cells constant.

The image display panel 10 displays a 2D image in a 2D mode under the control of the controller 12 and displays a 3D image in a 3D mode under the control of the controller 12.

In the 3D mode, the data voltage of 3D data format is applied to pixels positioned on odd-numbered (or even-numbered) horizontal lines of the image display panel 10, and a black gray level voltage is applied to pixels positioned on the even-numbered (or odd-numbered) horizontal lines of the image display panel 10. The black gray level voltage is displayed between vertically adjacent 3D images to thereby increase a display interval between the 3D images. As a result, in the 3D mode, an upward or downward viewing angle is wide, and the visibility of the 3D images is improved. Thus, unlike the related art, a separate black stripe pattern on the patterned retarder is not necessary in the embodiment of the invention.

In the 2D mode, the data voltage of 2D data format is applied to all the pixels of the image display panel 10. Because the separate black stripe pattern is not formed on the patterned retarder, moiré is not generated in the 2D mode. As a result, the image display device according to an embodiment of the invention can improve the visibility of the 2D image and can prevent a luminance reduction when the 2D image is displayed.

The driving circuit 14 includes a data driving circuit for driving the data lines of the image display panel 10 and a gate driving circuit for driving the gate lines of the image display panel 10.

In the 3D mode, the data driving circuit latches RGB digital video data of the 3D data format under the control of the controller 12 and converts the latched RGB digital video data into the R, G, and B data voltages of the 3D data format using a gamma compensation voltage. Also, the data driving circuit latches digital black data under the control of the controller 12 and converts the latched digital black data into the black gray level voltage using the gamma compensation voltage. The data driving circuit alternately supplies the RGB data voltages and the black gray level voltage to the data lines of the image display panel 10 every one horizontal period under the control of the controller 12.

In the 2D mode, the data driving circuit latches RGB digital video data of 2D data format under the control of the controller 12 and converts the latched RGB digital video data into the R, G, and B data voltages of 2D data format using the gamma compensation voltage. The data driving circuit then supplies the RGB data voltages to the gate lines of the image display panel 10.

The gate driving circuit sequentially supplies a scan pulse to the gate lines of the image display panel 10 under the control of the controller 12 and selects horizontal lines of the image display panel 10 to which the data voltage is applied.

The controller 12 controls the driving circuit 14 in the 2D mode or the 3D mode in response to a 2D or 3D mode selection signal of a user input through a user interface (not shown) or a 2D/3D identification code extracted from an input image signal. In the 3D mode, the controller 12 alternately rearranges the digital black data corresponding to one horizontal line produced inside the image display device and the RGB digital video data of the 3D data format corresponding to one horizontal line received from the outside. The controller 12 then supplies the rearranged digital black data and the rearranged RGB digital video data to the data driving circuit. In the 2D mode, the controller 12 supplies the RGB digital video data of 2D data format received from the outside to the data driving circuit.

The controller 12 generates timing control signals for controlling an operation timing of the driving circuit 14 using timing signals such as a vertical sync signal, a horizontal sync signal, a dot clock, and a data enable. The controller 12 may insert an interpolation frame between frames of an input image input at a frame frequency of 60 Hz and may multiply the timing control signals by N, thereby controlling an operation of the driving circuit 14 at a frame frequency of (60×N) Hz, where N is a positive integer equal to or greater than 2.

The backlight unit 17 includes a plurality of light sources and provides light to the image display panel 10. The backlight unit 17 may be implemented as one of an edge type backlight unit and a direct type backlight unit. In the direct type backlight unit, a plurality of optical sheets and a diffusion plate are stacked under the image display panel 10, and the plurality of light sources are positioned under the diffusion plate. In the edge type backlight unit, a plurality of optical sheets and a light guide plate are stacked under the image display panel 10, and the plurality of light sources are positioned at the side of the light guide plate. The light sources may be implemented as a line light source such as a cold cathode fluorescent lamp (CCFL) and an external electrode fluorescent lamp (EEFL), or a point light source such as a light emitting diode (LED).

The patterned retarder 18 may use one of a glass substrate, a transparent plastic substrate, and a film as a base to be patterned on the base. The base with the patterned retarder 18 formed thereon may be attached to the upper polarizing film 16*a* using an adhesive.

Figure 6:
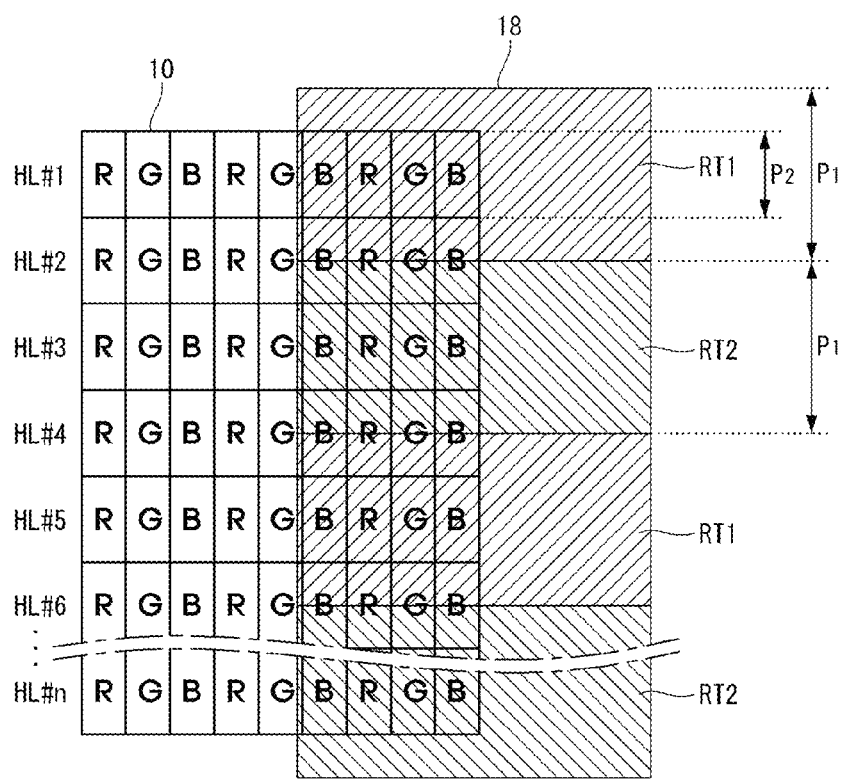
FIG. 6 illustrates an alignment location between an image display panel and a patterned retarder according to an exemplary embodiment of the present invention.

FIG. 6 illustrates an alignment location between an image display panel and a patterned retarder according to an exemplary embodiment of the present invention.

As shown in FIG. 6, the patterned retarder 18 includes a plurality of first and second retarders RT1 and RT2, whose phase retardation axes are perpendicular to each other. The plurality of first and second retarders RT1 and RT2 are alternately arranged line by line. The patterned retarder 18 divides the 3D image into polarization components.

The first retarder RT1 is formed on odd-numbered lines of the patterned retarder 18 and transmits a first polarization (for example, circular polarization or linear polarization) component of light incident through the upper polarizing film 16*a*. The second retarder RT2 is formed on even-numbered lines of the patterned retarder 18 and transmits a second polarization (for example, circular polarization or linear polarization) component of light incident through the upper polarizing film 16*a*. For example, the first retarder RT1 may be implemented as a polarization filter transmitting left circularly polarized light (or right circularly polarized light), and the second retarder RT2 may be implemented as a polarization filter transmitting right circularly polarized light (or left circularly polarized light).

A vertical pitch P1 of each of the first and second retarders RT1 and RT2 is set to be two times a vertical pitch P2 of the pixel. The patterned retarder 18 may be aligned on the image display panel 10, so that boundary portions of the first and second retarders RT1 and RT2 are positioned in the center of the pixels positioned on odd-numbered horizontal lines or in the center of the pixels positioned on even-numbered horizontal lines. For example, as shown in FIG. 6, the patterned retarder 18 may be aligned, so that the boundary portions of the first and second retarders RT1 and RT2 are positioned in the center of the pixels positioned on even-numbered horizontal lines HL#2, HL#4, HL#6, . . . . Further, although it is not shown, the patterned retarder 18 may be aligned, so that the boundary portions of the first and second retarders RT1 and RT2 are positioned in the center of the pixels positioned on odd-numbered horizontal lines HL#1, HL#3, HL#5, . . . . When the 3D image is displayed, the left eye image (or the right eye image) is displayed on the pixels of the horizontal lines corresponding to the first retarder RT1, the right eye image (or the left eye image) is displayed on the pixels of the horizontal lines corresponding to the second retarder RT2, and a black image is displayed on the pixels of the horizontal lines corresponding to the boundary portions of the first and second retarders RT1 and RT2. When the 2D image is displayed, the 2D image is displayed on all the pixels, and the patterned retarder 18 transmits light incident through the upper polarizing film 16*a* as it is without dividing the light incident through the upper polarizing film 16*a* into the polarization components.

Light absorption axes of a left eyeglass and a right eyeglass of the polarization glasses 20 are implemented differently from each other. For example, the left eyeglass of the polarization glasses 20 transmits the left circularly polarized light incident from the patterned retarder 18 and blocks light of other polarization components. The right eyeglass of the polarization glasses 20 transmits the right circularly polarized light incident from the patterned retarder 18 and blocks light of other polarization components. The left eyeglass of the polarization glasses 20 includes a left circular polarization filter, and the right eyeglass of the polarization glasses 20 includes a right circular polarization filter.

Figure 7:
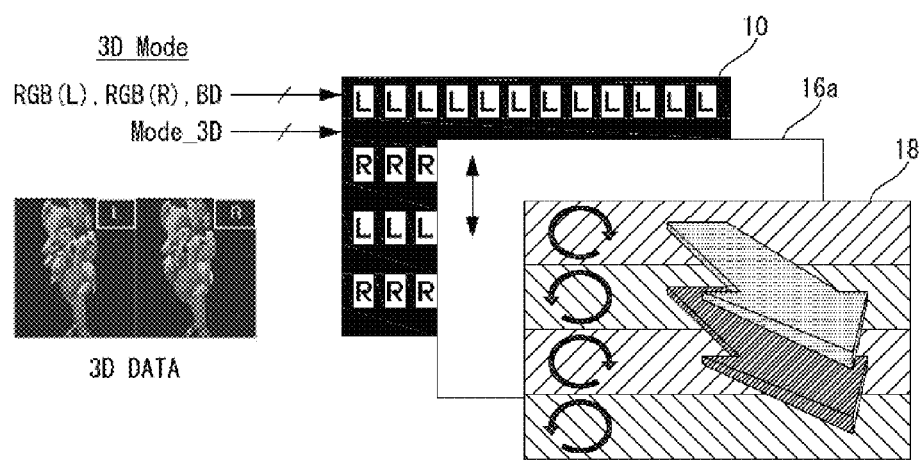
FIGS. 7 and 8 illustrate an exemplary operation of an image display device in a 3D mode according to an exemplary embodiment of the present invention.
Figure 7:
Figure 8:
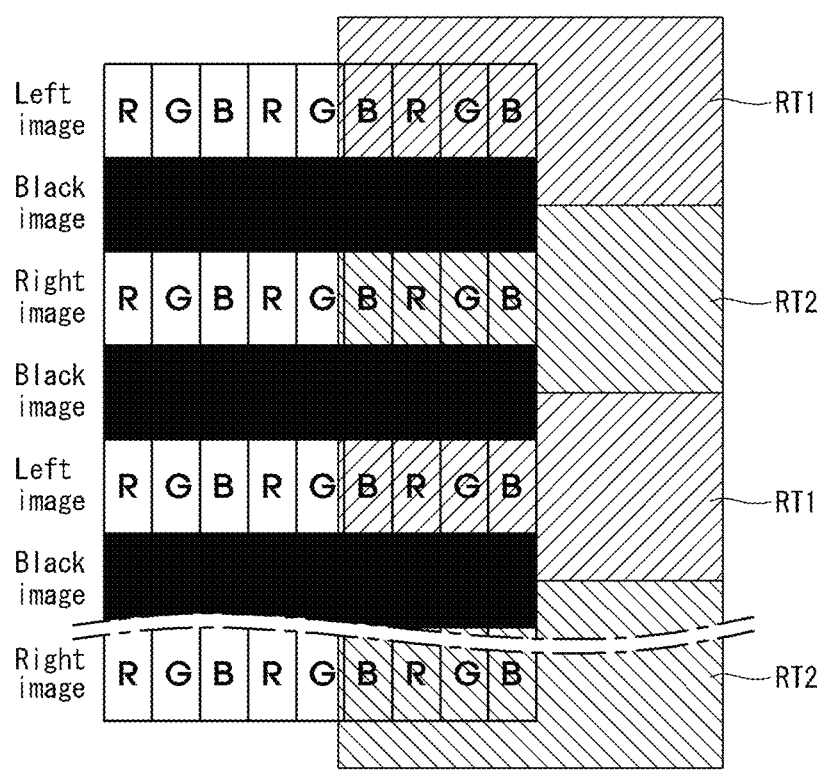

FIGS. 7 and 8 illustrate an exemplary operation of the image display device in the 3D mode according to an exemplary embodiment of the present invention.

As shown in FIGS. 7 and 8, in the 3D mode, a left eye RGB data voltage RGB(L) of the 3D data format and a right eye RGB data voltage RGB(R) of the 3D data format are alternately applied to the pixels positioned on the odd-numbered horizontal lines of the image display panel 10 every one horizontal line. As a result, a left eye image L is displayed on the pixels positioned on (2i−1)th horizontal lines, where i is a positive odd number, and a right eye image R are displayed on the pixels positioned on (2i+1)th horizontal lines. Each of the left eye image L and the right eye image R are divided into polarization components by the first and second retarders RT1 and RT2. The left eye image L, which has been transmitted through the first retarder RT1, is transmitted by the left eyeglass of the polarization glasses 20, and the right eye image R, which has been transmitted through the second retarder RT2, is transmitted by the right eyeglass of the polarization glasses 20, thereby displaying the 3D image.

In the 3D mode, the black gray level voltage BD is applied to the pixels positioned on the even-numbered horizontal lines of the image display panel 10, thereby displaying the black image. The black image increases the display interval between the left eye image L and the right eye image R that are displayed vertically adjacent to each other. As a result, in the 3D mode, the upward or downward viewing angle is widely secured to drastically improve the 3D visibility.

Figure 9:
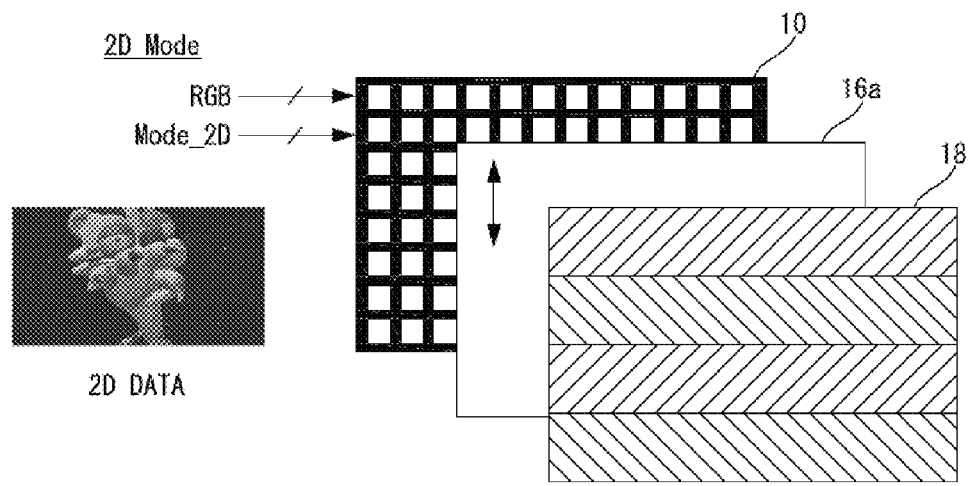
FIG. 9 illustrates an exemplary operation of an image display device in a 2D mode according to an exemplary embodiment of the present invention.

FIG. 9 schematically illustrates an exemplary operation of the image display device in the 2D mode according to an exemplary embodiment of the present invention.

As shown in FIG. 9, in the 2D mode, the RGB data voltage of the 2D data format is applied to all the pixels of the image display panel 10. The 2D image displayed using the RGB data voltage is transmitted by the patterned retarder 18 as it is and is shown to the user. Because the patterned retarder 18 does not have a separate black stripe pattern, a reduction in the luminance and the visibility of the 2D image can be prevented.

Figure 10:
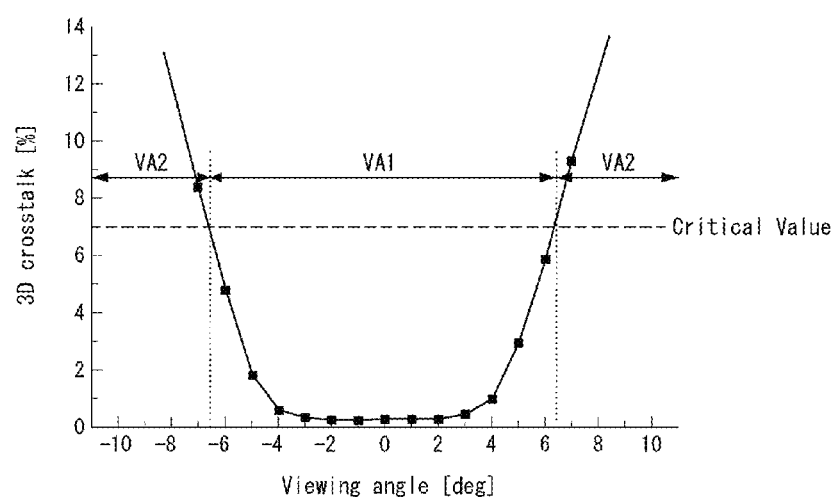
FIG. 10 is a graph illustrating a crosstalk value of a 3D image based on a 3D viewing angle according to an exemplary embodiment of the present invention.

FIG. 10 is a graph illustrating a crosstalk value of the 3D image based on the 3D viewing angle according to an exemplary embodiment of the present invention. In FIG. 10, a horizontal axis indicates an upward (+)/downward (−) viewing angle (unit: degree) of the 3D image, and a vertical axis indicates a 3D crosstalk value (unit: %).

In the structure of the image display device displaying the 3D image using the patterned retarder, as described above, the 3D image with good image quality may be displayed by transmitting only the left eye image using the left eye retarder and transmitting only the right eye image using the right eye retarder. However, when observing the image display device not at the front side but at a location of the upward/downward viewing angle, the left eye image may pass through the right eye retarder as well as the left eye retarder and the right eye image may pass through the left eye retarder as well as the right eye retarder. Hence, a 3D crosstalk C/T is generated. The generated 3D crosstalk C/T may be represented by the following Equation 1:

$$C/T\,[\%] = \frac{L_{Black}R_{White} - \text{Black}}{L_{White}R_{Black} - \text{Black}} \times 100 \qquad \text{[Equation 1]}$$

In Equation 1, '$L_{Black}R_{White}$' is a luminance value of a pattern displaying a black image on the left eye pixels and a white image on the right eye pixels, '$L_{Black}R_{White}$' is a luminance value of a pattern displaying the white image on the left eye pixels and the black image on the right eye pixels, and 'Black' is a luminance value measured after the black image is displayed on all the pixels. In general, a viewing angle obtained when the 3D crosstalk value C/T calculated through the above Equation 1 is equal to or less than 7% is defined as the 3D viewing angle at which the 3D image with the good image quality can be displayed. As a result, the 3D crosstalk value C/T of 7% is a critical value for determining the 3D viewing angle capable of obtaining the good 3D image. However, the critical value (for example, 7%) may vary depending on models of the image display device.

As indicated in the graph of FIG. 10, the user may view the 3D image of the good image quality within a viewing angle range VA1 in which the 3D crosstalk value (unit: %) is equal to or less than a predetermined critical value (e.g., 7%). On the other hand, the user may not view the 3D image of the good image quality within a viewing angle range VA2 in which the 3D crosstalk value (unit: %) is greater than the predetermined critical value (e.g., 7%) because of an overlap of the left and right eye images.

Figure 11:
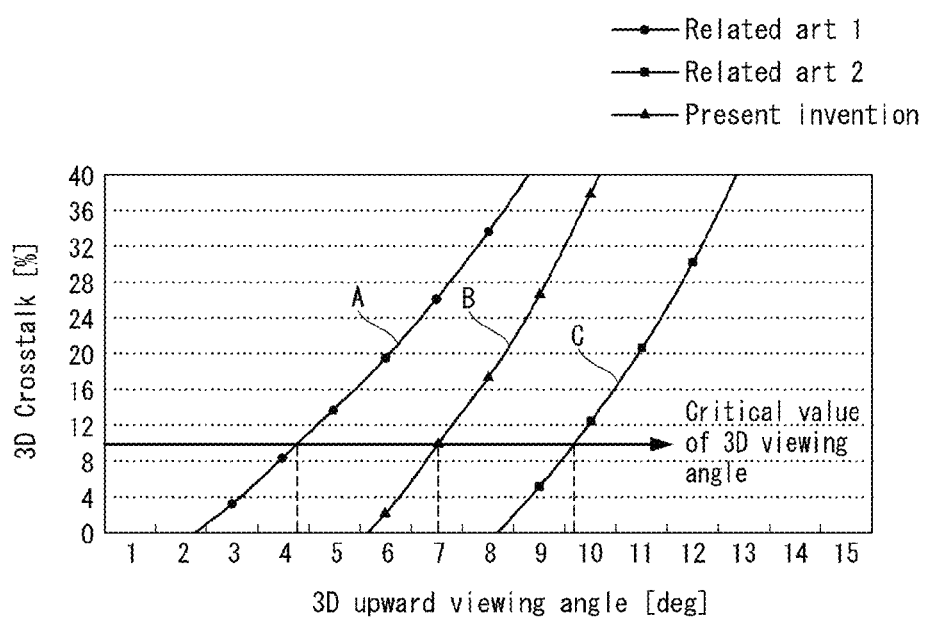
FIG. 11 is a graph illustrating a comparison between an upward viewing angle of a 3D image according to an exemplary embodiment of the invention and an upward viewing angle of a 3D image according to the related art.

FIG. 11 is a graph illustrating a comparison between an upward viewing angle of the 3D image according to the exemplary embodiment of the invention and an upward viewing angle of a 3D image in the related arts. In FIG. 11, a horizontal axis indicates the upward viewing angle (unit: degree) of the 3D image, and a vertical axis indicates a crosstalk value (unit: %) of the 3D image.

In FIG. 11, a graph 'A' indicates an upward viewing angle of the related art 1 in which left and right eye images have a display interval of 80 μm by black matrixes and a patterned retarder does not have a black stripe pattern. In the graph 'A' according to the related art 1, the upward viewing angle satisfying the critical value (e.g., 7%) of the 3D crosstalk is approximately 0° to 4° and is very narrow. A graph 'C' indicates an upward viewing angle of the related art 2 in which left and right eye images have a display interval of 80 μm by black matrixes and a patterned retarder has black stripe patterns with a width of 210 μm. In the graph 'C' according to the related art 2, the upward viewing angle satisfying the critical value (e.g., 7%) of the 3D crosstalk is approximately 0° to 10° and is relatively wide. However, the related art 2 has the side effects that the visibility and the luminance of the 2D image are reduced because of the presence of the black stripe patterns for securing the viewing angle.

On the contrary, when the 3D image is displayed, the exemplary embodiment of the invention can sufficiently secure the display interval between the left and right eye images without a separate black stripe pattern. Thus, as indicated by a graph 'B' in FIG. 11, the upward viewing angle satisfying the critical value (e.g., 7%) of the 3D crosstalk may increase to approximately 0° to 7° without reducing the visibility and the luminance of the 2D image.

It will be apparent to those skilled in the art that various modifications and variations can be made in the image display device of the present invention without departing from the spirit or scope of the invention. Thus, it is intended that the present invention cover the modifications and variations of this invention provided they come within the scope of the appended claims and their equivalents.

What is claimed is:

1. An image display device comprising:
an image display panel configured to display a 2D image and a 3D image;
a driving circuit configured to apply a data voltage of a 2D data format or a data voltage of a 3D data format to the image display panel;
a controller configured to control the driving circuit in a 2D mode for displaying the 2D image or a 3D mode for displaying the 3D image; and
a patterned retarder including a first retarder and a second retarder that are arranged line by line, the patterned retarder configured to divide the 3D image from the image display panel into a first polarization component and a second polarization component, the patterned retarder being aligned so that boundary portions of the first and second retarders are positioned in a center of pixels positioned on odd-numbered horizontal lines or even-numbered horizontal lines of the image display panel and the boundary portions of the first and second retarders are positioned in horizontal lines displaying a black image.

2. The image display device according to claim 1, wherein when the 3D image is displayed, a black image is displayed on pixels of horizontal lines corresponding to the boundary portions of the first and second retarders.

3. The image display device according to claim 1, wherein a vertical pitch of each of the first and second retarders is set to be two times a vertical pitch of each of the pixels.

4. The image display device according to claim 3, wherein when the 3D image is displayed, a left eye image and a right eye image are alternately displayed on pixels positioned on horizontal lines of the image display panel not corresponding to boundary portions of the first and second retarders every one horizontal line.

5. The image display device according to claim 4, wherein one of the left eye image and the right eye image is displayed on pixels of horizontal lines corresponding to the first retarder, and wherein the other is displayed on pixels of horizontal lines corresponding to the second retarder.

6. The image display device according to claim 1, wherein phase retardation axes of the first and second retarders are perpendicular to each other.

7. The image display device according to claim 6, wherein the first retarder transmits the first polarization component, and wherein the second retarder transmits the second polarization component.

8. The image display device according to claim 1, wherein in the 3D mode, the controller alternately rearranges digital black data corresponding to one horizontal line produced inside the image display device and RGB digital video data of the 3D data format corresponding to one horizontal line and supplies the rearranged digital black data and the rearranged RGB digital video data to the driving circuit.

9. The image display device according to claim 1, wherein in the 2D mode, the controller supplies RGB digital video data of the 2D data format received by the driving circuit.

10. An image display device comprising:
an image display panel to display a 2D image and a 3D image;
a driving circuit to apply a data voltage of a 2D data format or a data voltage of a 3D data format to the image display panel;
a controller to operate the driving circuit in a 2D mode such that a 2D image is displayed or a 3D mode such that a 3D image is displayed; and
a patterned retarder including alternating first and second retarders, the patterned retarder dividing the 3D image from the image display panel into a first polarization component and a second polarization component, the patterned retarder being aligned so that boundary portions of the first and second retarders are positioned in a center of pixels positioned on odd-numbered horizontal lines or even-numbered horizontal lines of the image display panel and the boundary portions of the first and second retarders are positioned in horizontal lines displaying a black image.

11. The image display device according to claim 10, wherein when the 3D image is displayed, a black image is displayed on pixels of horizontal lines corresponding to the boundary portions of the first and second retarders.

12. The image display device according to claim 10, wherein a vertical pitch of each of the first and second retarders is set to be two times a vertical pitch of each of the pixels.

13. The image display device according to claim 12, wherein when the 3D image is displayed, a left eye image and a right eye image are alternately displayed on pixels positioned on horizontal lines of the image display panel not corresponding to boundary portions of the first and second retarders every one horizontal line.

14. The image display device according to claim 13, wherein one of the left eye image and the right eye image is displayed on pixels of horizontal lines corresponding to the first retarder, and wherein the other is displayed on pixels of horizontal lines corresponding to the second retarder.

15. The image display device according to claim 10, wherein phase retardation axes of the first and second retarders are perpendicular to each other.

16. The image display device according to claim 15, wherein the first retarder transmits the first polarization component, and wherein the second retarder transmits the second polarization component.

17. The image display device according to claim 10, wherein in the 3D mode, the controller alternately rearranges digital black data corresponding to one horizontal line produced inside the image display device and RGB digital video data of the 3D data format corresponding to one horizontal line and supplies the rearranged digital black data and the rearranged RGB digital video data to the driving circuit.

18. The image display device according to claim 10, wherein in the 2D mode, the controller supplies RGB digital video data of the 2D data format received by the driving circuit.

19. The image display device according to claim 10, wherein the first and second retarders are arranged line by line.

* * * * *